Oct. 21, 1958      P. L. LEWIS      2,856,630
FISH SKINNING MACHINE
Filed March 9, 1956      10 Sheets—Sheet 1
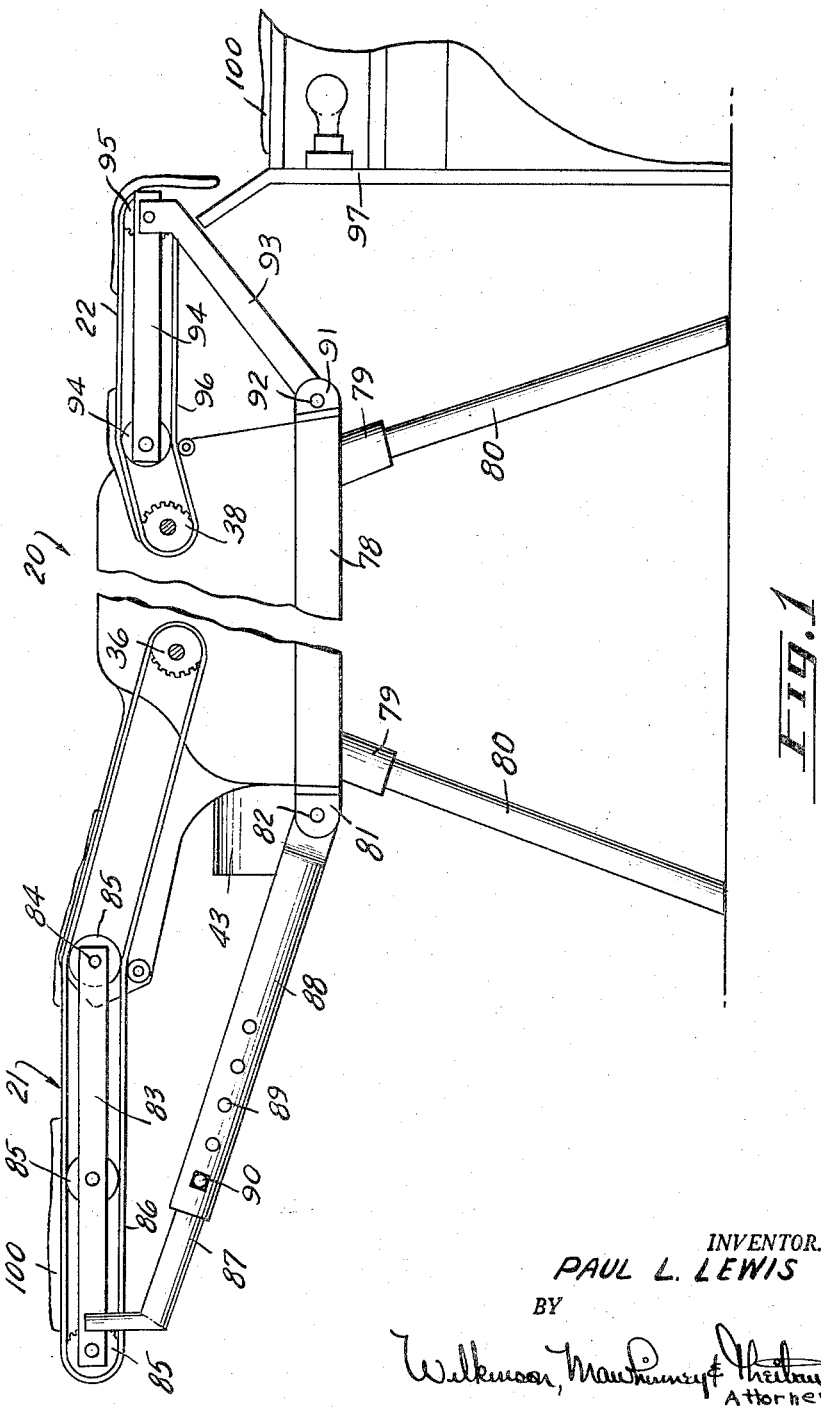
INVENTOR.
PAUL L. LEWIS
BY
Attorneys

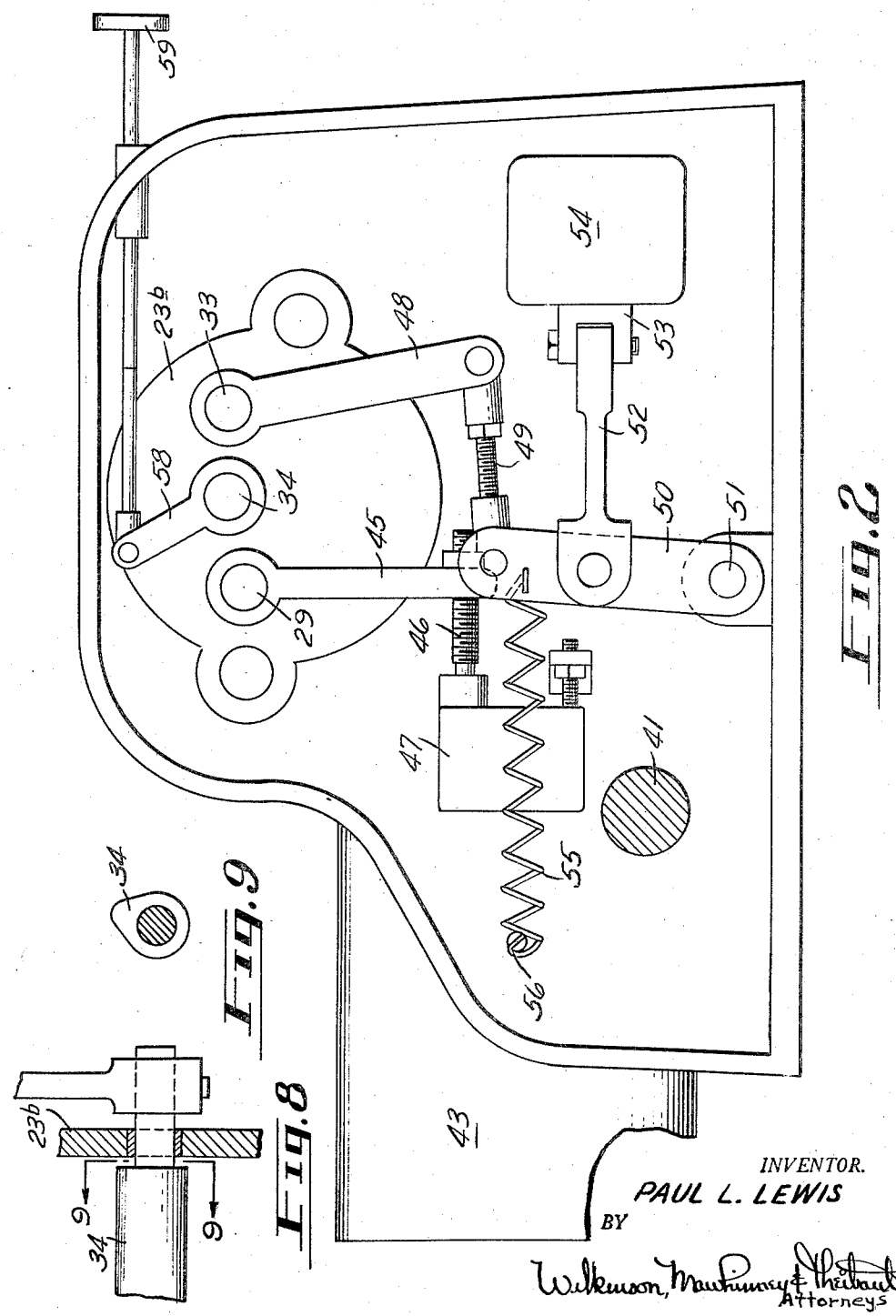

Oct. 21, 1958 P. L. LEWIS 2,856,630
FISH SKINNING MACHINE
Filed March 9, 1956 10 Sheets-Sheet 3
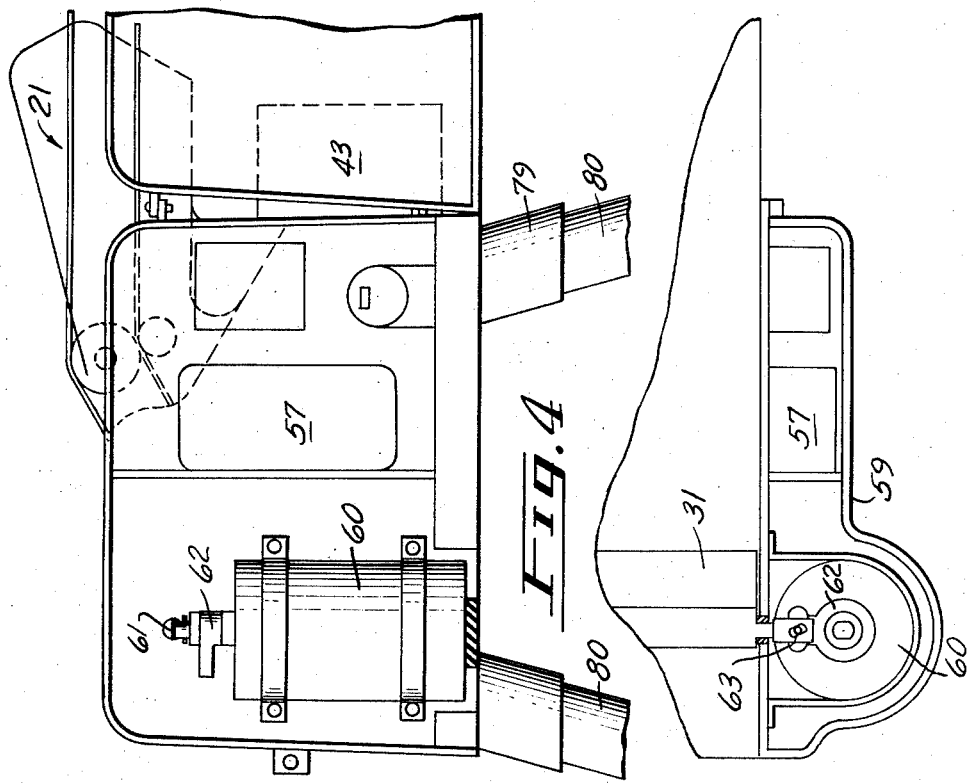
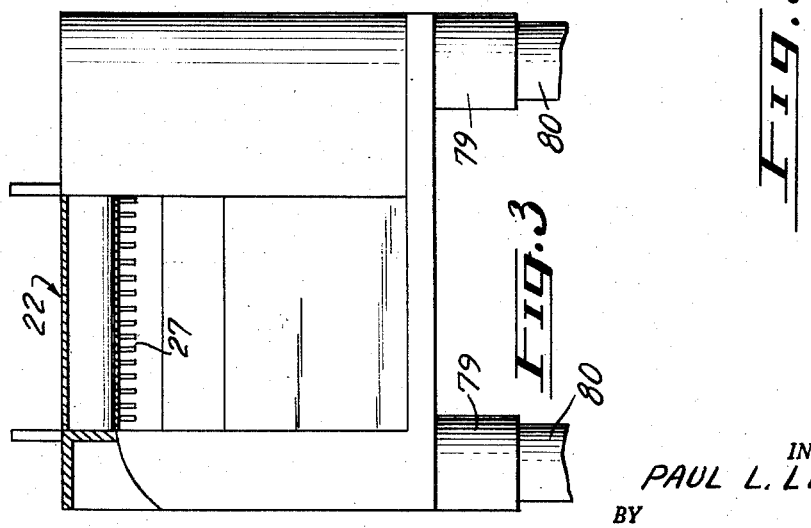
INVENTOR.
PAUL L. LEWIS
BY
Attorneys Oct. 21, 1958    P. L. LEWIS    2,856,630
FISH SKINNING MACHINE
Filed March 9, 1956    10 Sheets-Sheet 4
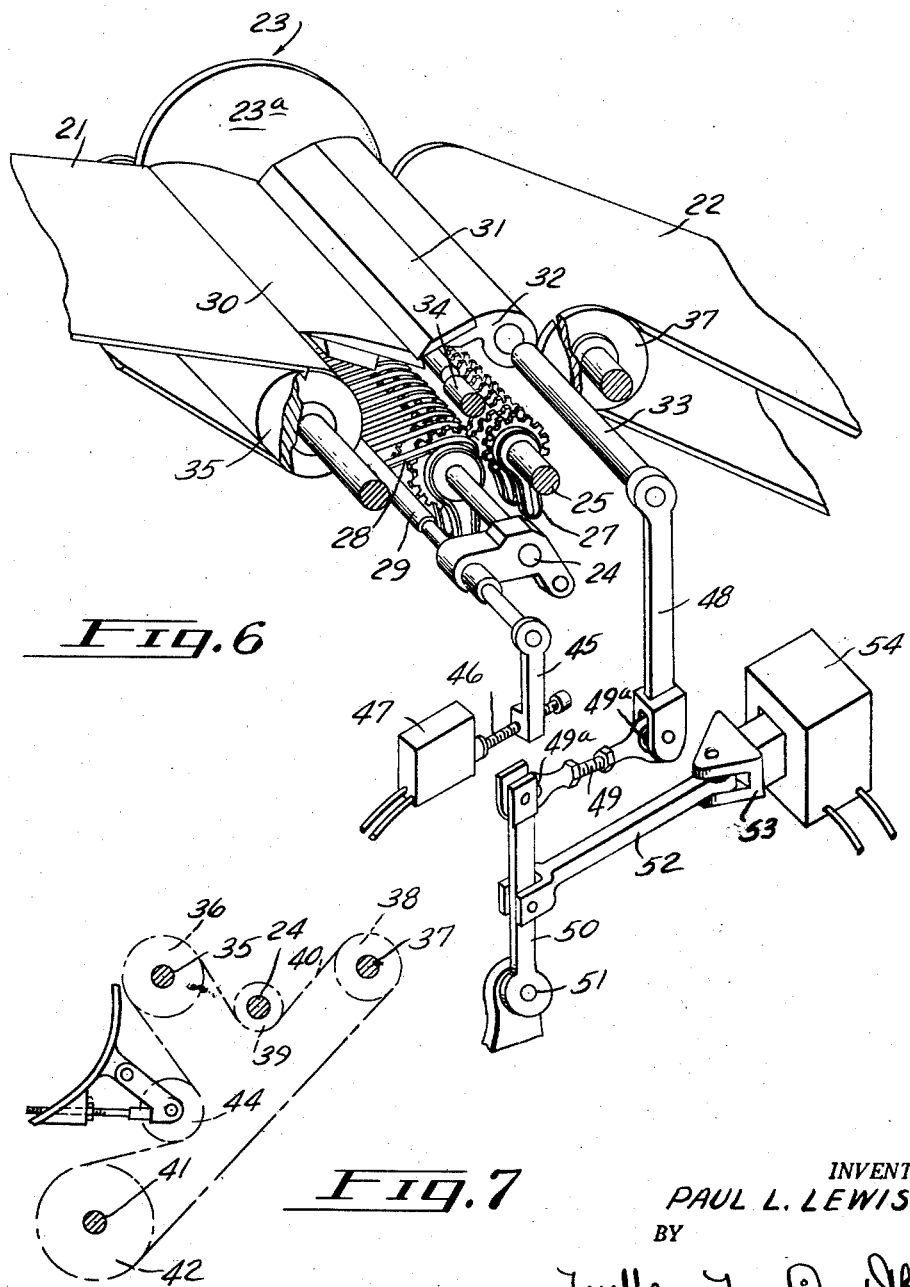
INVENTOR.
PAUL L. LEWIS
BY
Wilkinson, Mawhinney Thibault
Attorneys Oct. 21, 1958 P. L. LEWIS 2,856,630
FISH SKINNING MACHINE
Filed March 9, 1956 10 Sheets-Sheet 5

INVENTOR.
PAUL L. LEWIS
BY
Wilkinson Mawhinney & Thibault
Attorneys

Oct. 21, 1958   P. L. LEWIS   2,856,630
FISH SKINNING MACHINE
Filed March 9, 1956   10 Sheets-Sheet 6
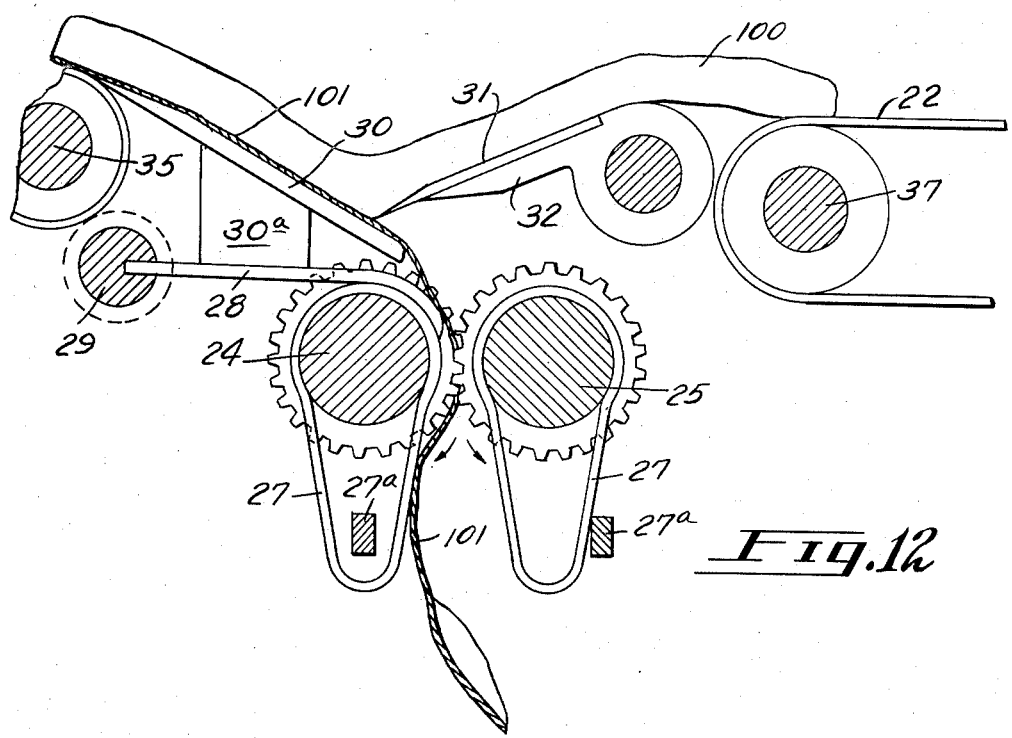
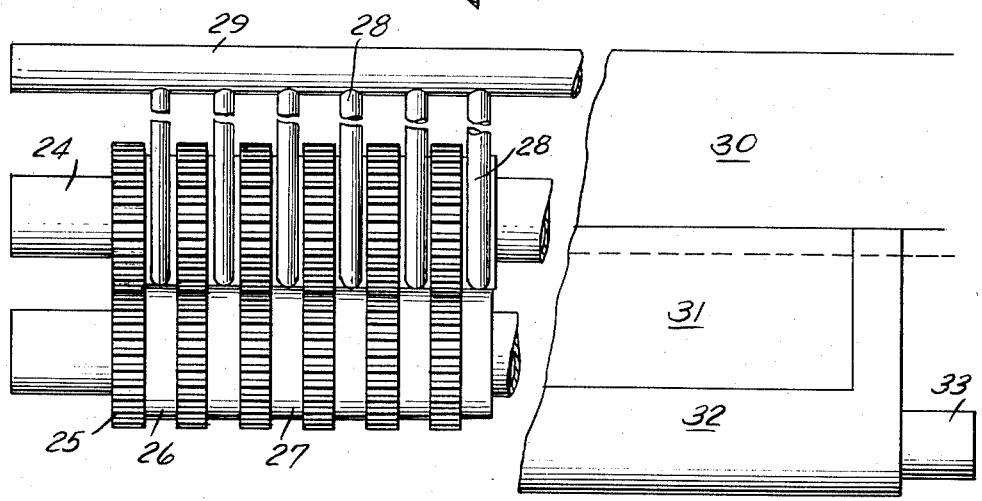
INVENTOR.
PAUL L. LEWIS
BY
Wilkinson, Mawhinney & Theibault
Attorneys Oct. 21, 1958 P. L. LEWIS 2,856,630
FISH SKINNING MACHINE
Filed March 9, 1956 10 Sheets-Sheet 7

INVENTOR.
PAUL L. LEWIS
BY

Oct. 21, 1958 P. L. LEWIS 2,856,630
FISH SKINNING MACHINE
Filed March 9, 1956 10 Sheets-Sheet 8

INVENTOR.
PAUL L. LEWIS
BY
Wilkinson, Mawhinney & Theibault
Attorneys

Oct. 21, 1958 P. L. LEWIS 2,856,630
FISH SKINNING MACHINE
Filed March 9, 1956 10 Sheets—Sheet 10

INVENTOR
PAUL L. LEWIS
BY
ATTORNEYS

United States Patent Office 2,856,630
Patented Oct. 21, 1958

2,856,630

FISH SKINNING MACHINE

Paul L. Lewis, Coral Gables, Fla.

Application March 9, 1956, Serial No. 570,461

12 Claims. (Cl. 17—2)

The present invention relates to fish skinning machine and more particularly to that type which skins fillets and has for an object to provide a machine having the conventional skinning knife and skin pulling gears or rollers with a means for interrelating the skinning knife with the skin pulling members to obtain a skinning relationship therebetween only when a fillet is presented to the machine for skinning.

Another object of the present invention is to provide the fish skin pulling members with antiwrap devices which are carried on the skin pullers and which are spaced axially along the length of the members and which have relatively short transverse width thereby reducing the area to which a fish skin may cling. The improved antiwraps being spaced along the members permit a water spray to be directed between adjacent antiwraps to further reduce the likelihood of a fish skin clinging thereto. The antiwrap devices prevent the fish skin being pulled from the fillet from becoming wrapped about the skin pulling gears clogging same and thereby reducing efficiency.

A further object of the present invention is to provide a fillet sensing device in circuit with the skinning knife and positioned upstream of the knife to signal the presence of a fillet to actuate the skinning knife.

A still further object of the present invention is to provide a fish skinning machine of the character described with a supply and discharge conveyor the speeds of which are related with the skin pulling members to assure a constant supply of fillets without clogging or jamming the skinning head.

A still further object of the present invention is to provide a skinning knife depth control means to limit the penetration of the skinning knife into the fillet to permit use of the machine upon various species of fish having different thickness of skin.

A still further object of the present invention is to provide an electrical control circuit between a set of pressure fingers, which are the fillet sensing means, and the skinning knife through a solenoid for actuating the knife and a time delay component which will maintain the knife in the lowered or skinning position for a predetermined time interval after the pressure fingers have raised signalling the passage of a fillet thereover. This is important where due to a tear in the fish skin the fingers may rise before the whole fillet has been skinned.

A still further object of the present invention is to provide a water system for a machine of the character described which will lubricate the skinning knife, the antiwraps and the skin pulling means as well as cleanse the same.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevational view of a fish skinning machine constructed in accordance with the present invention having parts broken away.

Figure 2 is a side elevational view of a portion of the machine of Figure 1 showing the skinning head actuating control mechanism thereof and taken at an enlarged scale.

Figure 3 is a front elevational view of the machine of Figure 1, with parts broken away.

Figure 4 is a side elevational view taken from the rear of Figure 1 having parts broken away and parts shown in section.

Figure 5 is a fragmentary top elevational view of the machine construction of Figure 4.

Figure 6 is a fragmentary perspective view having parts broken away and parts shown in section of a fillet skinning head for the machine constructed in accordance with the present invention.

Figure 7 is a schematic view of the chain drive mechanism of the machine constructed in accordance with the present invention.

Figure 8 is a fragmentary vertical sectional view of the knife blade depth control mechanism employed in the present invention.

Figure 9 is a vertical section taken on the lines 9—9 in Figure 8.

Figure 12 is a view similar to Figures 10 and 11 showing the skinning knife in skinning engagement with the fillet.

Figure 13 is a fragmentary top plan view with parts broken away showing a portion of the skinning head of the machine constructed in accordance with the present invention.

Figure 10:
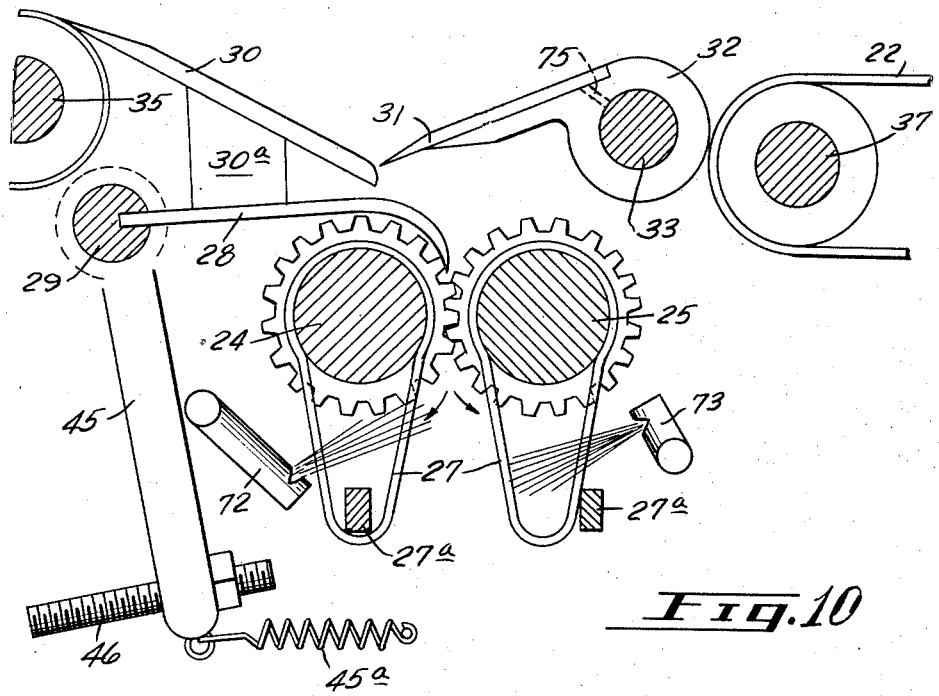
Figure 10 is a diagrammatic view of the skinning head of a machine constructed in accordance with the present invention in origin position.

Referring more particularly to the drawings and for the moment to Figures 1 and 6, 20 designates generally a fish skinning machine having a supply conveyor 21 and a discharge conveyor 22. Lying between the conveyors 21 and 22 is the skinning head 23 (Figure 6). This skinning head 23 may be removed as a unit from the machine for servicing, repair or replacement.

The skinning head 23 may consist of a pair of skin pulling members 24, 25 journaled in a pair of disc like inserts 23ª and 23ᵇ. The members 24 and 25 consist of a plurality of pinion-like gear members spaced axially along a shaft. Between each of the pinion-like members is defined an annular groove 26. The toothed members of the two skin pulling members 24, 25 intermesh at their points of contact so that rotation of one member compels rotation of the other. The annular grooves 26 carry therein antiwrap devices 27. These antiwrap devices are best seen in Figure 6 and Figures 10 through 12, inclusive. Adapted to overlie the antiwrap devices 27 on the skin pulling member 24 are a plurality of pressure fingers 28 rigidly secured to a pressure finger shaft 29 which is rockably mounted in the skinning head 23. Positioned above the skin pulling members 24, 25 is a table 30 over which and upon which fillets to be skinned are passed. This table 30 cooperates with a skinning knife 31 carried by a knife support 32 mounted on a shaft 33 which is rockable in the fish skinning head 23. Cooperating with the knife blade 31 is a knife blade penetration limiting cam 34, positioned to be engaged by the knife and to limit its penetration.

Adjacent the above-described components of the fish skinning head upstream of the skinning station is a drive roller 35 for driving the conveyor 21. A sprocket 36 is secured to the roller shaft 35 for driving the same.

Downstream of the skinning knife 31 is another drive roller 37 for driving the conveyor referred to as the discharge conveyor 22. The roller shaft 37 is also provided with a drive sprocket 38 as best seen in Figure 7.

The skin pulling shaft 24 has secured thereto a drive sprocket 39 which meshes with a drive chain 40 which is connected to drive all of the sprockets 36, 38 and 39 of the machine. The prime mover source is a shaft 41 driving a sprocket 42 and receiving its power from a motor 43 through any desired gear reducing transmission (not shown). An idler sprocket 44 is provided to adjust the proper driving tension on the drive chain 40. This is shown in Figure 7 in detail. The idler pulley support bracket is pivoted to the machine casing and is provided with a threaded bolt having a nut and guide thereon for being set at any desired tension on the drive chain 40.

The pressure finger shaft 29 carries an arm 45 secured thereto for rotation and rocking movement therewith. This arm 45 has an adjustable plunger 46 thereon for contacting and actuating a micro-switch 47. The knife rocking shaft 33 is also provided with a rock lever 48 connected through an adjusting link 49 to a solenoid controlled operating arm 50 which is pivoted to the machine frame at 51. This solenoid operating arm 50 is connected to a thrust link 52 which is in turn pivotally connected to the armature 53 of a solenoid 54.

The lever 50 is normally biased to the left or rear of the machine. This is accomplished by a spring 55 one end of which is secured to the lever 50 and the other end secured to the machine housing at 56. In the position shown in Figure 2 the solenoid has been actuated drawing the armature 53 into the coil 54 and the spring 55 is distended and upon opening of the solenoid circuit the spring 55 will move the lever 50 to the left in Figure 2 which will shift the rod 48 to the left about its shaft 33 thereby elevating the skinning knife blade 31.

Figure 16:
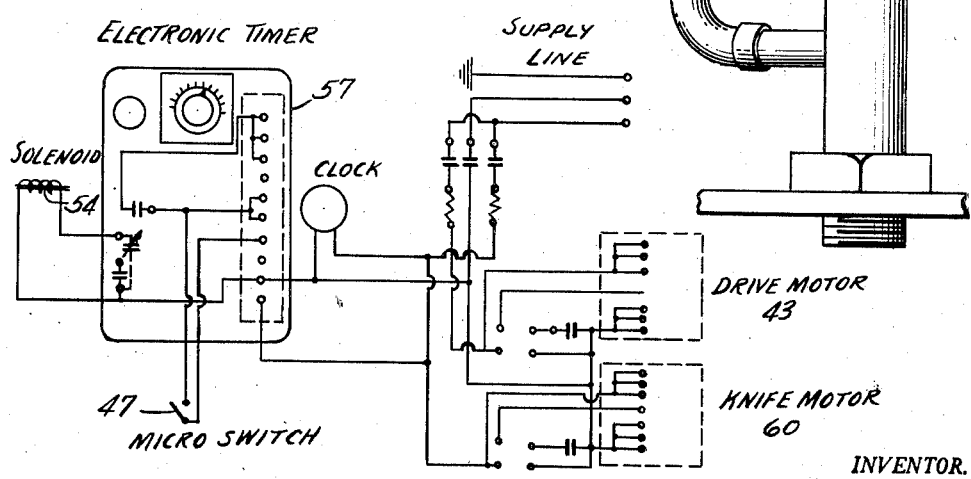
Figure 16 is a schematic electrical diagram of the supply and control circuits of the various electrical components of a machine constructed in accordance with the present invention.

The micro-switch 47 is in circuit with the solenoid 54 and has an electronic timing device 57 also in circuit therewith, as best seen in Figure 16.

The skinning knife 31 is controlled so that the cutting edge of the blade may be varied in cutting depth in order to permit its use on different species of fish having different thicknesses of skin. For instance, the skin of the tuna fish is of one thickness while the skin of a haddock is of a lesser thickness. This control cam 34 is actuated by a lever 35 which is secured to the cam 34 to impart rocking or rotary movement thereto. The upper end of an arm or lever 58 is conected to a rod 59 having an operating knob 59a for adjusting, by sliding movement, the position of the cam 34 to regulate the depth of penetration of the knife skinning blade 31.

Referring for the moment to Figures 4 and 5, the skinning knife blade 31 is reciprocated by a motor 60 mounted on the rear of the machine housing and protected by a water-tight casing 61. This motor 60 is provided with an eccentric weight 62 and is connected to the skinning knife blade support 32 at 61. Also located within the water-tight casing 61 is the electronic timing unit 57.

The front or right side of the machine containing the compartment housing the micro-switch, solenoid, and various operating levers for controlling the skinning head is likewise encased in a water-tight housing to protect the same from the water used to cleanse and lubricate the entire operation of fish skinning.

The antiwrap members 27 are initially of a ring-like construction having sharp edges and being substantially rectangular in cross-section. The rings are placed in the grooves 26 on the skin pulling members 24, 25 and are crimped to form shown in Figures 10 through 12, inclusive. The substantially sharp edges on the anti-warp members provide knife-like cutting edges which do not permit wrapping of a fish skin thereover but tend to cut the fish skin and due to their transverse restricted width, offer little surface area to which the skin may cling. These antiwraps hang down beneath the skin pulling members and act as stops or scrape-offs to keep the fish skin from the fillet being skinned from wrapping about the skin pulling members 24, 25 and clogging the same. The antiwraps are longer in length than the diameter of the skin pulling members.

Cooperating with the antiwraps is the water system of the machine constructed in accordance with the present invention and this water system consists of a central stand pipe 64 carried on the side of the machine illustrated in Figure 4 slightly to the rear of the electric motor 60. The stand pipe 64 has a plurality of outlets, for instance a supply line 65 to the cutter blade reciprocating mechanism and a supply line 66 and 67 to the supply conveyor. Supply lines 68 and 69 lead to horizontally disposed tubes 70 and 71 each of which contains a plurality of nozzles, long nozzles 72 and short nozzles 73 for washing and lubricating the anti-wraps. As shown in Figure 10, the nozzles 72 lubricate the antiwraps upstream of the skinning knife while the nozzles 73 lubricate the anti-wraps downstream of the skinning knife. The skinning knife support 32 has a bore 74 therethrough forming a passage for a stream of water and has a plurality of outlets 75 communicating the bore 74 with the top of the knife support 32 for directing lubricating water on the knife edge as the same is vibrated into cutting engagement with a fillet. A supply line 76 is provided for lubricating the supply conveyor 21 and is provided with a plurality of outlets 77.

The base of the stand pipe 64, may be provided with a main water shut-off valve to which a supply of water may be connected.

Since the knife 31 and its carrier 32 must be reciprocated, the shaft 33 and connected arm 48 also reciprocate therewith. To permit this reciprocation while imparting the rocking movement to the knife blade 31, the adjustable link 49 is provided with universal bearings 49a which permit this transverse reciprocation without misalignment of the lever 50 about its pivot 51.

Figure 11:
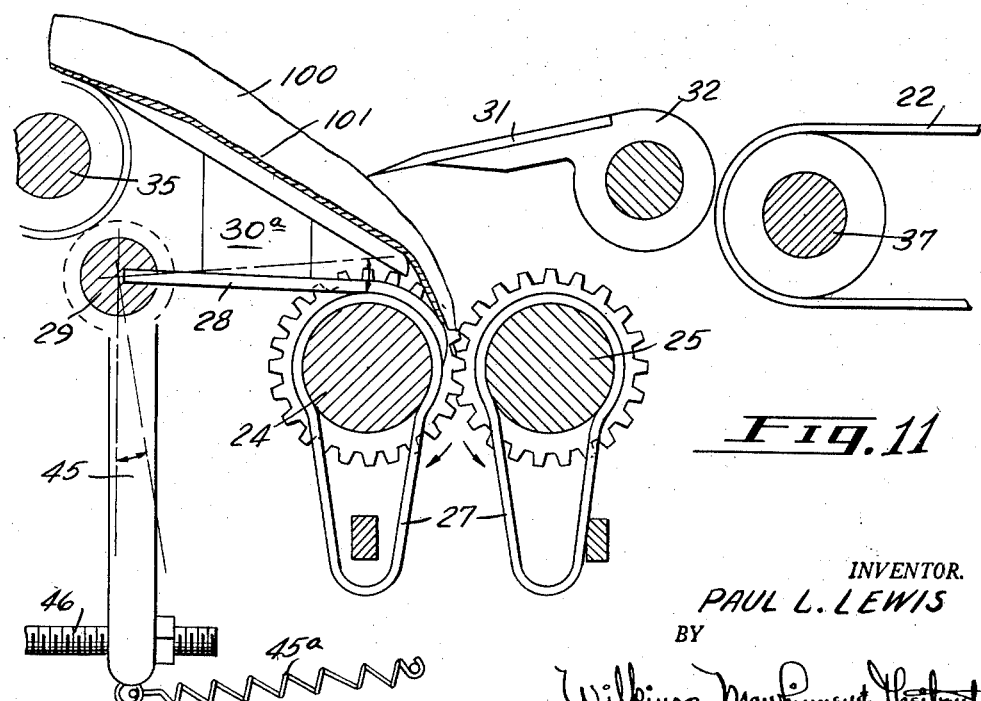
Figure 11 is a view similar to Figure 10 showing a fillet introduced between the skin pulling members.
Figure 14:
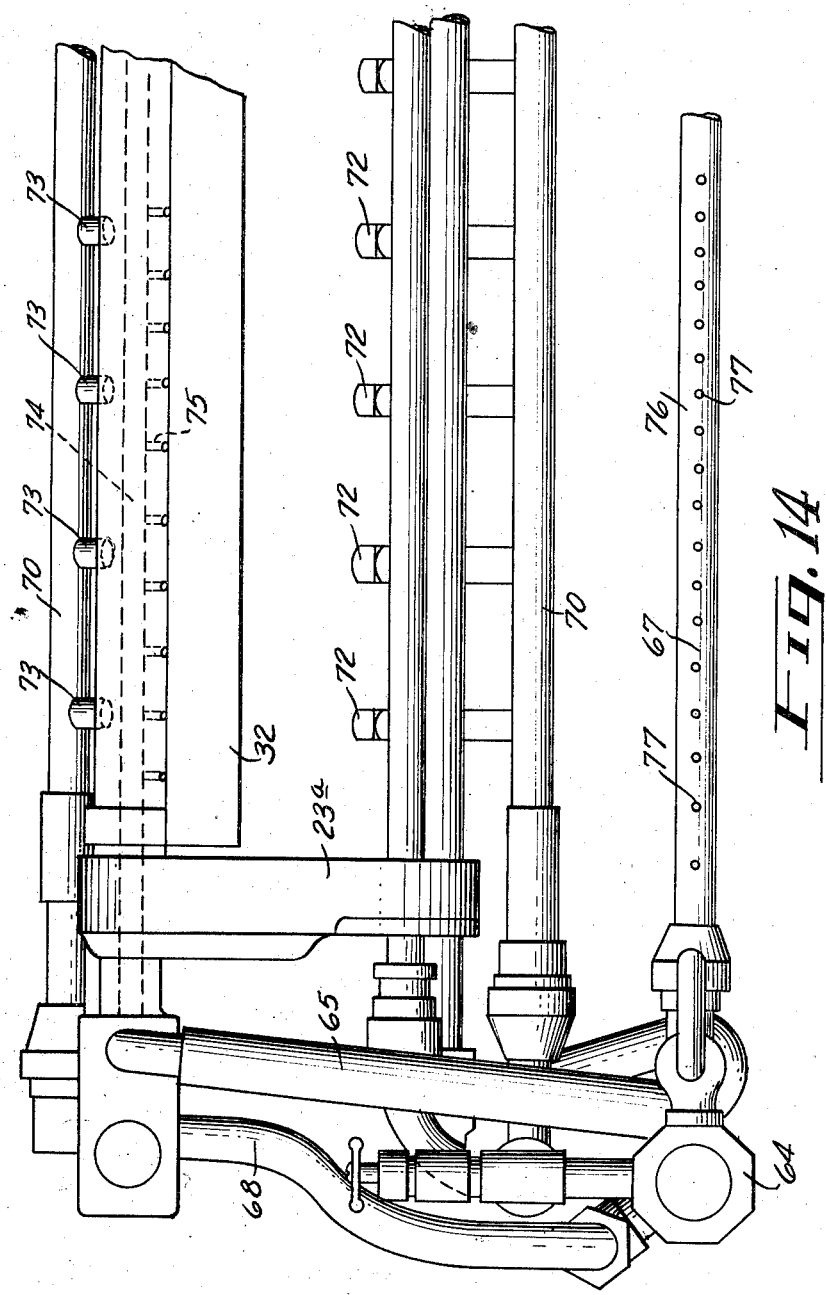
Figure 14 is a top plan view of the water cleaning and lubricating system employed in connection with the present invention.
Figure 15:
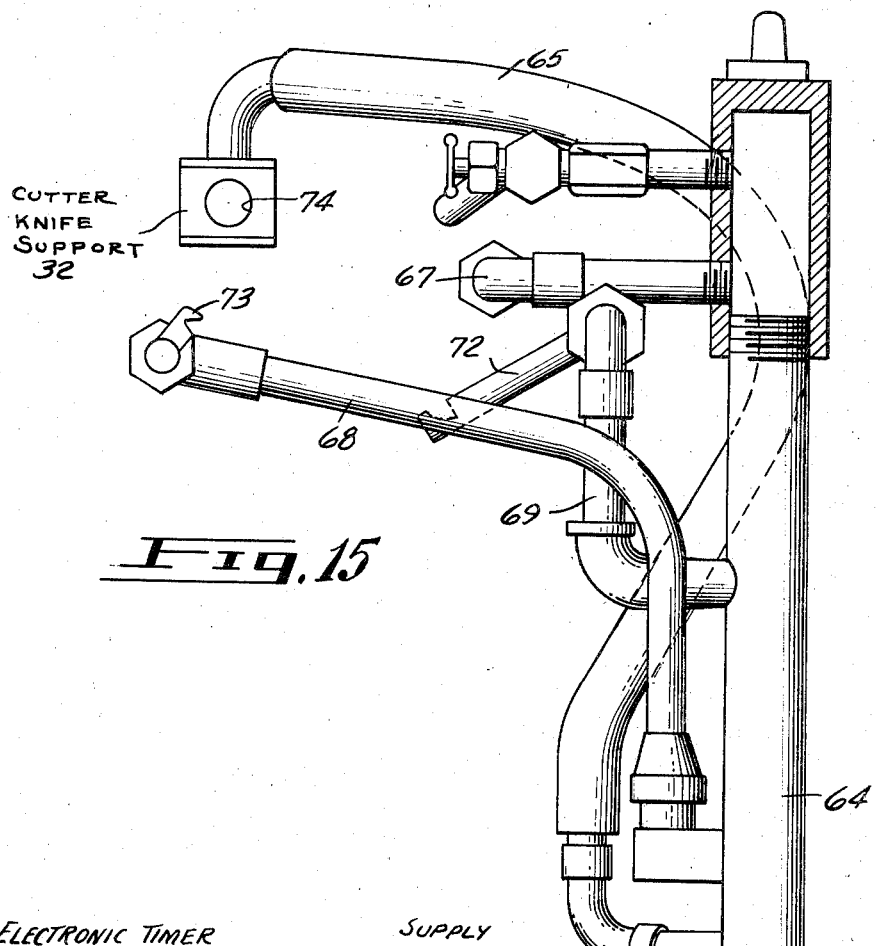
Figure 15 is a fragmentary side elevational view with parts broken away and parts shown in section of the water system of Figure 14.

Referring more particularly to Figures 10 through 12, inclusive, the operation of the machine will now be described. A fillet 100 to be skinned is conveyed on the supply conveyor 21 onto the table 30. The legs 30a resting upon the pressure fingers 28 under the weight of the fillet cause the pressure fingers to rotate in a clockwise direction, as best seen in Figure 11. The fillet then enters between the skin pulling members 24 and 25. This rocking movement of the pressure fingers 28 causes the arm 45 to be rocked in a clockwise direction distending the spring 45a and causing the plunger 46 to actuate the micro-switch 47 which closes the solenoid circuit 54. The solenoid upon being energized draws the armature 53 within the coil 54 thereby pulling on thrust rod 52 which rocks lever 50 about its pivotal base 51 causing the lever 48 to rock in a counterclockwise direction imparting a counterclockwise rotation to the shaft 33 causing the knife 31 to bite into or gouge into the fillet down to the skin 101 thereof. The depth of penetration of the knife 31 is of course under control of the depth penetration control cam 34, the knife blade 31 striking the selected surface of the cam 34 thereby limiting the downward movement thereof. The cam 34 has been previously set dependent upon the type of fish fillet to be skinned. The skin pulling members 24, 25 then continue to pull the fillet skin through their nip and to exert a pressure on the pressure fingers 28 to maintain the micro-switch in a closed position so that the cutting blade will maintain its relationship with the fillet. The pulling motion of the skin pullers 24, 25 advances the fillet over the top of the cutting blade 31 onto the discharge conveyor 22 while the skin is being pulled from the fillet.

Referring more particularly to Figure 1, the machine constructed in accordance with the present invention is placed under a base 78 having leg sockets 79 from which legs 80 extend to support the machine above the floor. At the rear of the machine the base 78 is provided with a perforated lug 81 for receiving a pivot bolt therethrough. The supply conveyor 21 is provided with a conveyor support structure 83 pivoted to the rear of the machine at 84. This structure 83 carries three idler rollers 85 for retaining and guiding the conveyor belt 86. The structure 83 is positioned by an adjustable arm structure consisting of a pair of telescopic members 87 and 88. The member 88 being pivoted to the pivot bolt 82 at the base of the machine and the member 87 having a forked arm for supporting the structure 83 at its free end. It is to be noted that this supply conveyor may be elevated from its free end and to that end the member 88 is provided with openings 89 for receiving a retaining pin 90 therethrough.

The front of the machine carries a similar perforated lug 91 having a bolt 92 therethrough for receiving and securing a support arm 93 which is secured to the free end of the discharge conveyor structure 94. This discharge conveyor structure carries also two rollers 95 over which the conveyor belt 96 is passed. The drive for these two conveyors has been described hereinbefore and is taken from the main motor 43 through the gear transmission shaft 41 and driving chain 40 which meshes with sprockets 36 and 38 for driving the supply and discharge conveyors respectively.

After the fillet has been discharged from the skinning machine and directed over the discharge conveyor 22, the fillet falls upon a light inspection table 97 which has a glass top to permit inspection of the skinned fillet for worms or the like.

The antiwraps 27 having their elongated downwardly hanging projections cooperate with limit stops 27a positioned to constrain the antiwraps against rotary movement.

Figure 17:
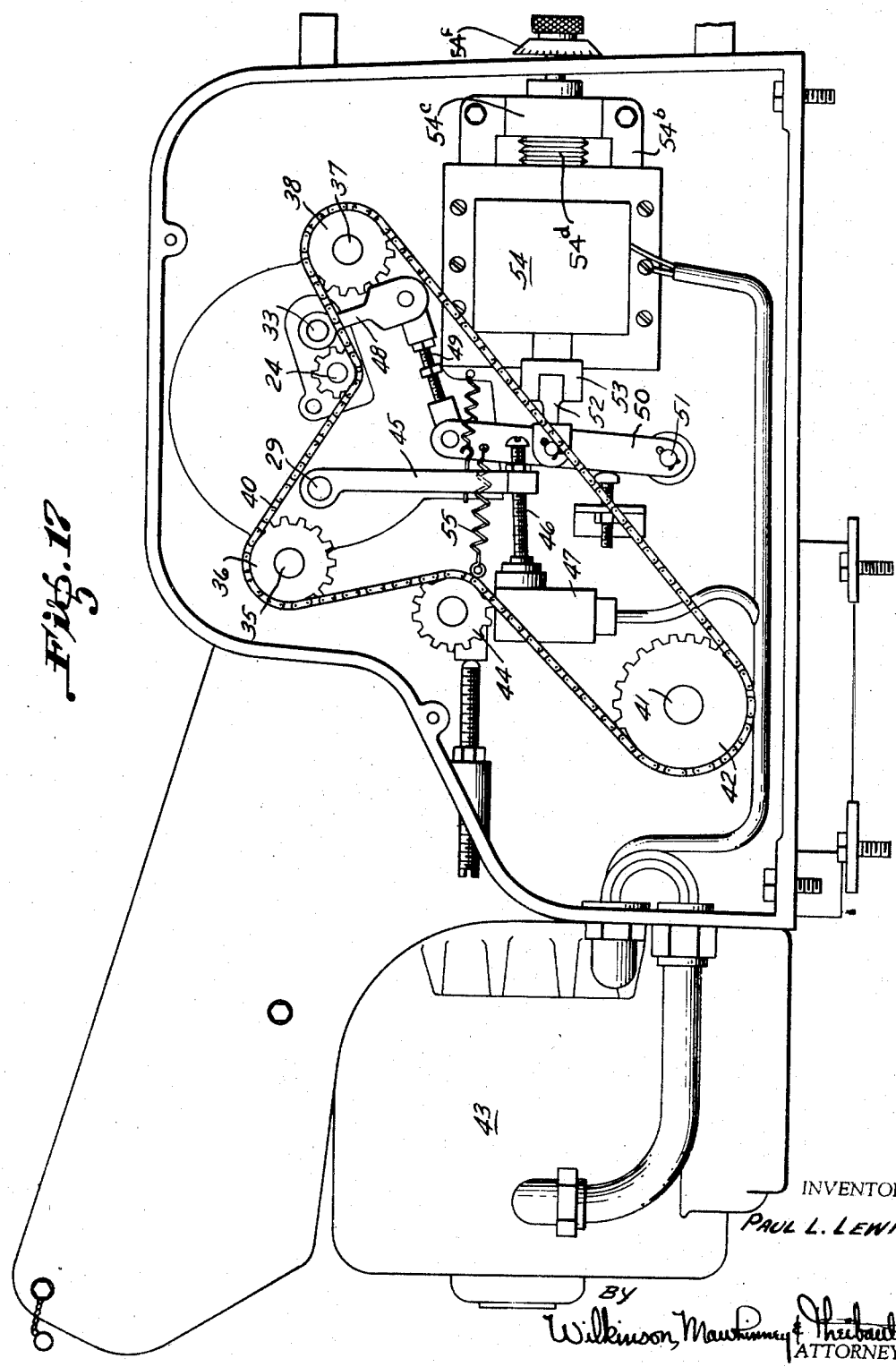
Fig. 17 is a side elevational view of a machine constructed in accordance with the present invention having a modified form of knife penetrating control means.
Figure 18:
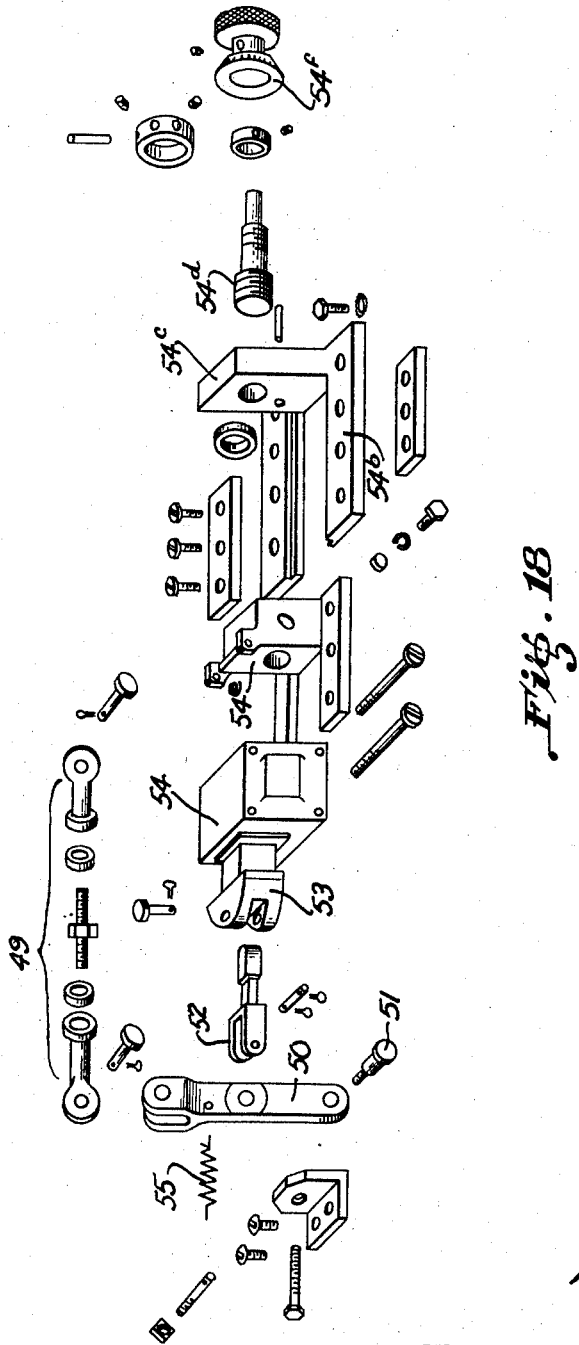
Figure 18 is an exploded perspective view of the modified knife penetrating control means shown in assembled condition in Figure 17.

Referring to Figures 17 and 18, a knife penetrating control means is shown which differs from that shown in Figures 2, 8 and 9 in that the cam 34 and its rocker arm 58 have been eliminated. Since the angle of attack of the knife, and hence its depth of penetration into the fillet, is controlled by the rocking of arm 48 controlled by arm 50 driven by members 52, 53 influenced by solenoid 54, the amount of throw of the armature 53 can and will in this form of the invention control the depth of the knife penetration into the fillet.

To attain the desired penetration of the knife, a bracket support 54b is mounted on the side of the frame. This bracket 54b has a threaded block 54c which accommodates a threaded shaft 54d to drive a block 54e to which the solenoid 54a is secured for movement along the bracket support 54b. This movement along the support bracket 54b will of course, as best seen in Figure 17, vary the throw of arm 50, link 49 and arm 48 which rocks the knife shaft 33. The free end of shaft 54d contains thereon an adjusting knob 54f bearing indicia calibrated to designate different depths of penetration of the skinning knife. Upon rotation of the knob 54f the shaft 54d will rotate causing the block 54c to be shifted toward or away from arm 50, thereby regulating the throw of the solenoid armature 53. It is well known that, for a given number of turns on the coil and a predetermined length and cross section of armature, the sucking effect of the coil on the armature can be regulated. By applying this principle I have found that a highly accurate degree of regulation of knife penetration can be had.

Although I have disclosed herein the best form of the invention known to me at this time, I reserve the right to all such modifications and changes as may come within the scope of the following claims.

What is claimed is:

1. A fish skinning machine adapted to be supplied with unskinned fillets comprising unskinned fillet supply means, fillet sensing means comprising a table for receiving the unskinned fillet from the supply means and adapted to be depressed by the weight of the fillet thereon, a pair of skinning rollers for receiving the fillet from said table, a skinning knife positioned above said rollers to engage the unskinned fillet, knife actuating means operatively associated with said knife for moving said knife into engagement with a fillet to be skinned by said rollers, pressure fingers operatively associated with said skinning rollers and being positioned to be engaged and depressed by said table while the fillet is being skinned by said rollers, and means operatively associated with said pressure fingers and knife actuating means for causing said skinning knife to engage the fillet and remove the skin therefrom when the table and pressure fingers are depressed and the skinning rollers engage the fillet.

2. A machine for skinning fish comprising a pair of skinning gears the axes of rotation of which are fixed with respect to one another, a knife blade positioned above said skinning gears, means operatively associated with the skinning gears for feeding unskinned fillets to said skinning gears, pressure fingers operatively associated with said skinning gears so that the skinning gears cause the skin of the fillet under tension to engage the pressure fingers when the fillets are fed to the skinning gears, knife actuating means operatively associated with said knife and pressure fingers and actuated by said pressure fingers for causing said knife to engage a fillet to remove the skin therefrom.

3. A fish skinning machine comprising a pair of skin pulling members adapted to impart a tension to the skin of the fish when passing between the members, pressure fingers adapted to partially overlie one of said skin pulling members and to have transferred thereto as pressure energy the tension imparted to the fish skin to move the pressure fingers, a skinning knife positioned over said skin pulling members and being movable to a skinning position but normally biased to an inoperative position, a circuit including a micro switch positioned to be actuated by said pressure fingers upon movement of the pressure fingers, a solenoid connected to said skinning knife to move said knife into skinning engagement with a fillet, said solenoid being in circuit with said micro switch and being actuated thereby, whereby upon a fillet moving said pressure fingers to close the micro switch the solenoid is energized causing the knife to engage the fillet entering between said skin pulling members to separate the skin from the fillet.

4. A fish skinning machine as claimed in claim 3 further comprising timing means in circuit with said solenoid for maintaining the knife in a skinning position after the pressure fingers have permitted the micro switch to open to assure complete skinning of the fillet and to guard against tears in skin permitting the pressure fingers to rise.

5. A fish skinning machine comprising cooperating skin pulling members, means for feeding the fish to said members, a skinning knife movable into and out of fish engaging position, means for moving said knife to its fish engaging position, and inclined weight actuated means operatively associated with said fish feeding means and said knife moving means adapted to be actuated by the weight of a fish thereon to actuate said knife moving means.

6. A fish skinning machine as claimed in claim 5 further comprising antiwrap means carried by said skin pulling members and being spaced axially therealong, and washing means operatively associated with said antiwrap means and skinning knife to facilitate removal of the fish skin from said machine.

7. A fish skinning machine as claimed in claim 5 further comprising antiwrap means associated with each of said skin pulling members and being spaced axially along said members and having relatively narrow skin engageable surfaces whereby a minimum contact area is presented to the fish skin removed by said skin pulling members to prevent wrapping of the skin about the skin pulling members and antiwrap means.

8. A fish skinning machine as claimed in claim 5 further comprising antiwrap means on each of said members spaced axially therealong, and washing means positioned to direct water between adjacent spaced apart antiwrap means to prohibit fish skins from clinging thereto.

9. A machine for skinning fish as claimed in claim 2 further comprising antiwrap members associated with each of said skinning gears and being spaced axially therealong, said antiwrap members having portions extending beneath the skinning gears, and abutment means operatively associated with said extending portions of said antiwrap members but separate therefrom for restricting rotary movement of the antiwrap members.

10. A fish skinning machine as claimed in claim 5, further comprising means associated with said knife to limit the depth of penetration of the knife into the fillet to compensate for fillets having a different thickness of skin.

11. A fish skinning machine as claimed in claim 10 wherein said last-named means is a cam positioned to be engaged by the skinning knife, said cam being rotated to present the desired operating point to the skinning knife by a rocker arm influenced by a control rod.

12. A fish skinning machine as claimed in claim 10 wherein the last-named means comprises an adjustable solenoid connected to actuate the skinning knife and regulate the depth of penetration of the knife into the fillet.

References Cited in the file of this patent

UNITED STATES PATENTS

| | | |
|---|---|---|
| 2,215,114 | Baader et al. | Sept. 17, 1940 |
| 2,455,831 | Townsend | Dec. 7, 1948 |
| 2,590,747 | Birdseye | Mar. 25, 1952 |
| 2,605,495 | Daniels | Aug. 5, 1952 |

FOREIGN PATENTS

| | | |
|---|---|---|
| 741,799 | Great Britain | Dec. 14, 1955 |